United States Patent [19]
Howe, Jr. et al.

[11] 3,885,872
[45] May 27, 1975

[54] DIGITAL PROXIMITY SENSING SYSTEM

[75] Inventors: James J. Howe, Jr., Portland, Oreg.; James C. Yarrington, Endicott, N.Y.

[73] Assignee: International Business Machines Corporation, Armonk, N.Y.

[22] Filed: June 12, 1973

[21] Appl. No.: 369,378

[52] U.S. Cl. .......................... 356/4; 356/1; 250/561
[51] Int. Cl. .............................................. G01c 3/08
[58] Field of Search .......... 356/1, 4, 5; 354/25, 163; 250/561

[56] References Cited
UNITED STATES PATENTS

| | | | |
|---|---|---|---|
| 3,771,873 | 11/1973 | Tourret | 356/4 |
| 3,788,741 | 1/1974 | Buechler | 356/4 |
| 3,792,928 | 2/1974 | Poilleux | 356/4 |
| 3,815,994 | 6/1974 | Peckham | 356/4 |

Primary Examiner—Maynard R. Wilbur
Assistant Examiner—S. C. Buczinski
Attorney, Agent, or Firm—Paul M. Brannen; George E. Clark

[57] ABSTRACT

A digital proximity sensing system includes a light source, a pair of photosensitive transducers such as phototransistors, one of which is arranged to have a first voltage output characteristic with respect to the distance between the object to be sensed and the photosensitive transducer and the other of which is arranged to have a second voltage output characteristic with respect to the distance between the object to be measured and the photosensitive transducer differing from said first characteristic. The respective outputs from the photosensitive transducers are amplified by a pair of amplifiers of which one is adjustable. The amplified outputs are then compared to determine which voltage signal is greater. An initial adjustment is made with an object at a predetermined distance $D_o$, so that the voltage outputs of the respective amplifiers are equal. The relative magnitude of the voltage outputs of the respective amplifiers as compared results in an indication of the position of the object to be sensed relative to the predetermined distance $D_o$.

4 Claims, 3 Drawing Figures

3,885,872

DIGITAL PROXIMITY SENSING SYSTEM

FIELD OF THE INVENTION

The present invention relates to proximity sensing systems and more particularly to electro-optical proximity sensing systems in which errors due to variations in reflectivity and light intensity are minimized.

BACKGROUND OF THE INVENTION

Optical proximity sensors measure reflected light intensity to detect an object within a predetermined proximity range.

In the prior art, optical proximity sensors are known which have included a single photosensitive element for detecting reflected light from an object. The output signal from the photosensitive element was then compared against a predetermined fixed standard.

The prior art proximity sensors are subject to error due to variations in reflectivity of the objects to be sensed as well as variations in light intensity. A measurement system relying on the comparison of the output of a single photosensitive element with a predetermined fixed standard is unable to respond to variations in reflectivity or light intensity.

SUMMARY OF THE INVENTION

Therefore, it is an object of the present invention to sense proximity of an object with apparatus including a plurality of photosensitive transducers having output signals which are compared to obtain a digital indication of proximity.

It is another object of the present invention to sense proximity of an object with apparatus including a plurality of photosensitive transducers having different light responsive output signal characteristics, and a comparator for comparing the output signals from the photosensitive transducers to obtain an indication of proximity.

Accordingly, an optical reflectance compensating proximity sensor embodying the present invention includes a light source for illuminating an object which is to be sensed for proximity, first and second photosensitive transducers, the first transducer optically arranged to have a first voltage output characteristic with respect to the distance of the object, and the second transducer optically arranged to have a second voltage output characteristic with respect to the distance of the object, first and second amplifiers for amplifying the outputs of the first and second transducers, one of the amplifiers being adjustable to equalize the amplifier output voltages when an object is placed at a predetermined proximity distance, and a comparator for comparing the outputs of the first and second amplifiers to indicate proximity of the object relative to the predetermined proximity distance.

It is an advantage of the present invention that by comparing the outputs of two photosensitive transducers, variations in reflectivity of the object and light intensity are cancelled.

It is another advantage of the present invention that by having one amplifier adjustable, the system can be used in situations where the nominal proximity distance $D_o$ is varied.

The foregoing and other objects, features and advantages of the invention will be apparent from the following more particular description of a preferred embodiment thereof, as illustrated in the accompanying drawing.

DETAILED DESCRIPTION OF A PREFERRED EMBODIMENT OF THE INVENTION

Figure 1:
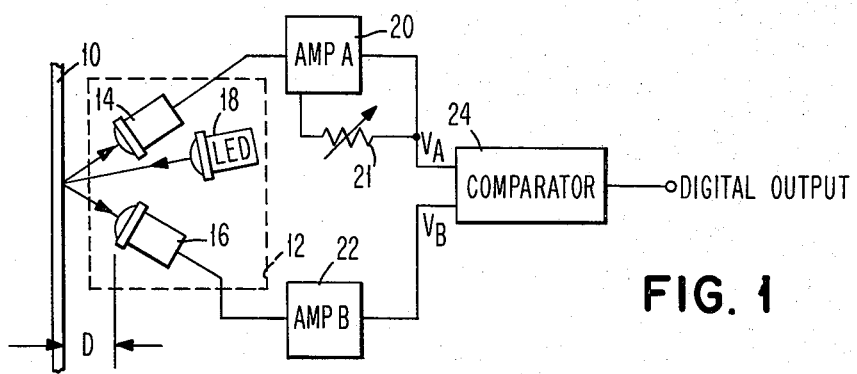
FIG. 1 is a block diagram of apparatus embodying the present invention.

Referring now to FIG. 1, a block diagram of a proximity sensing system is shown for detecting the proximity of an object 10.

A sensor head 12 includes a first photosensitive transducer 14, a second photosensitive transducer 16 and a light source 18 such as a light emitting diode. The output of transducer 14 is connected to amplifier 20 and the output of transducer 16 is connected to amplifier 22. The gain of amplifier 20 is adjustable by variable resistor 21.

Figure 2:
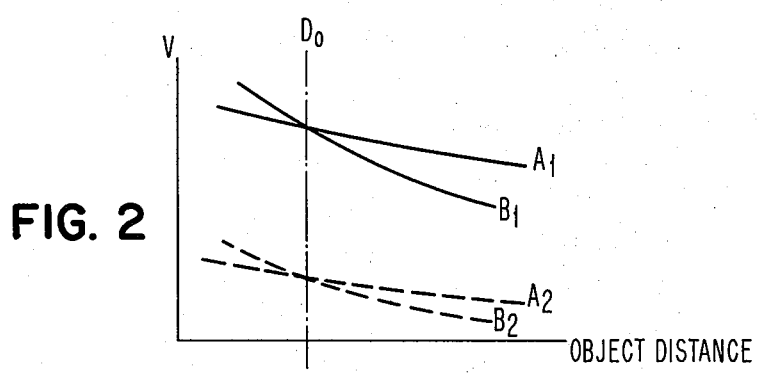
FIG. 2 is a plot of amplifier output voltage against object to transducer distance for each of the photosensitive transducers for two levels of object reflectivity or light intensity.

Amplifier 20 is designated A and amplifier 22 is designated B for ease in understanding the voltage curves shown in FIG. 2.

The output signal $V_A$ from amplifier 20 and the output signal $V_B$ from amplifier 22 are connected as inputs to comparator 24. Voltage comparator 24 produces a digital output signal which is indicative of the relative magnitudes of inputs $V_A$ and $V_B$.

The distance between object 10 and sensing head 12 is indicated in FIG. 1 by distance D. A predetermined nominal proximity distance is indicated in FIG. 2 as $D_o$.

Referring now to FIG. 2, a plot of amplifier output voltage against object distance is shown.

Curve $A_1$ represents the output voltage characteristic of amplifier 20 and photosensitive transducer 14 relative to object distance with an object of high reflectivity or with a high light intensity from light source 18. Curve $B_1$ represents the voltage output of amplifier 22 (and thus photosensitive transducer 16) for high reflectivity objects or high intensity light source.

It should be noted at this point that the voltage/distance characteristic of photo-sensitive transducer 14 as represented by curve $A_1$ is relatively flat compared with curve $B_1$ indicating that the output of transducer 14 is more independent of object distance than is the output of transducer 16. In comparison, curve $B_1$ shows a larger decrease in output voltage with object distance than does $A_1$ which indicates a relatively greater change between output voltage $V_B$ of amplifier 22 (and thus transducer 16) with object distance. The output voltage characteristics shown in FIG. 2 result from the physical arrangement and positioning of transducers 14 and 16 and light source 18. One example of such a physical arrangement is shown in FIG. 1, where light source 18 is positioned so as to cause transducer 14 to be more insensitive to proximity distance than transducer 16.

Figure 3:
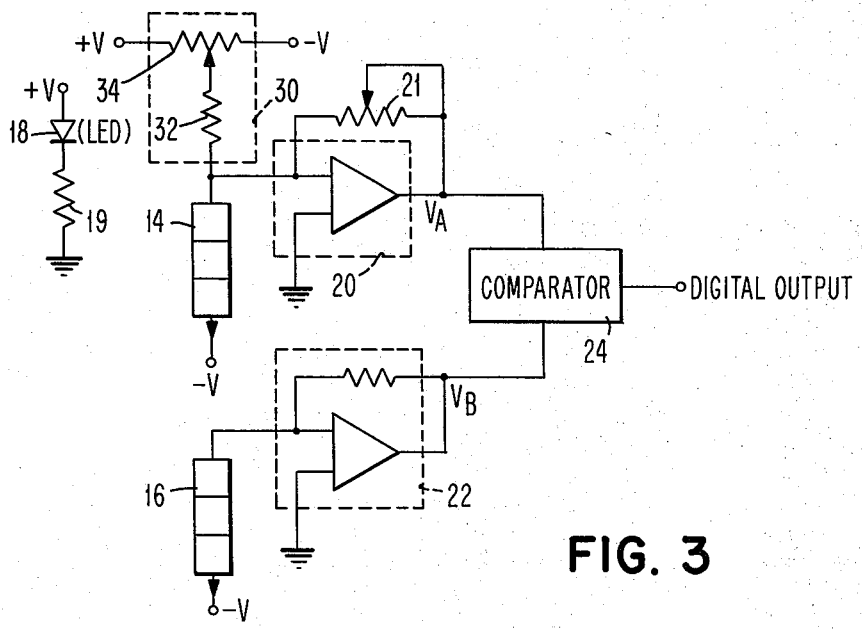
FIG. 3 is a schematic diagram of a system embodying the present invention showing the adjustment circuits.

The adjustment circuits shown in FIG. 3 are adjusted to achieve the characteristics shown in FIG. 2.

The second set of curves labelled $A_2$ and $B_2$ in FIG. 2 represent the voltage outputs $V_A$ and $V_B$ at low light intensities or with objects 10 having low reflectivity.

The point at which curve $A_1$ crosses curve $B_1$ and the point at which curve $A_2$ crosses curve $B_2$ is indicated as object distance $D_o$. This is the nominal object distance and is predetermined based upon system requirements. It should be noted that the cross point for curves $A_1$ and $B_1$ for high reflectivity occur at the same distance as the cross point for curves $A_2$ and $B_2$ at low reflectivity. This is due to a fixed proportionality between reflectance and transducer output within the operating range of the system. Variable resistor 21 shown in FIG. 1 is used to adjust the gain of amplifier 20 so that the crossover point between curves $A_1$ and $B_1$ and between curves $A_2$ and $B_2$ can be adjusted to occur at the predetermined object distance $D_o$.

Referring now to FIG. 3, the initial adjustment procedure will be described.

Light emitting diode 18 is connected in a series circuit with resistor 19 to a voltage supply $+V$.

Photosensitive transducer 14 is connected between voltage source $-V$ and offset correction circuit 30 which consists of fixed resistor 32 and variable resistor 34.

Offset correction circuit 30 and gain control variable resistor 21 are adjusted by the following procedure.

a. An object of high reflectivity is placed at the predetermined nominal proximity distance $D_o$.

b. Variable resistor 21 is adjusted so that $V_A$ equals $V_B$ as indicated by a zero output from digital comparator 24.

c. An object of low reflectivity is then placed at distance $D_o$ and offset control variable resistor 34 is adjusted so that $V_A$ equals $V_B$.

Since the adjustment of variable resistor 34 interacts with the adjustment of variable resistor 21, several iterations of the adjustment process may be required until there is no change in the relative values of $V_A$ and $V_B$ for an object of high reflectivity to an object of low reflectivity placed at object distance $D_o$.

In operation, as an object 10 moves into a sensing position, digital comparator 24 will produce a first output level indicating $V_A$ greater than $V_B$ if object 10 is at an object distance greater than $D_o$ and comparator 24 will produce a second output level indicating $V_B$ greater than $V_A$ for objects situated at object distances less than $D_o$. Thus the proximity sensing system produces a digital output signal indicative of the proximity of an object relative to the predetermined nominal object distance $D_o$.

While the invention has been particularly shown and described with references to the preferred embodiment thereof, it will be understood by those skilled in the art that various changes in form and detail may be made therein without departing from the spirit and scope of the invention.

What is claimed is:

1. A proximity sensor comprising:
 a light source,
 first and second photosensitive elements responsive to light from said source reflected from an object,
 said first photosensitive element being positioned to receive light from said source directly reflected from said object,
 said second photosensitive element being positioned to receive light from said source diffusively reflected from said object, and
 means for comparing outputs from said photosensitive elements to obtain an indication of proximity, wherein said photosensitive elements have differing output characteristics with respect to displacement between said photosensitive elements and said object, said characteristics each comprising a voltage-displacement relationship in which the voltage decreases with respect to increase in displacement, said characteristics having an intersection with each other at a nominal predetermined displacement from said object.

2. Apparatus according to claim 1 wherein said means for comparing further comprises:
 first and second amplifiers, one of said amplifiers having an adjustable gain characteristic; and
 a voltage comparator for providing a digital output signal determined by relative magnitudes of output signals from said amplifiers.

3. Apparatus for determining displacement of an object with respect to a reference point, comprising:
 a light source for providing illumination of said object;
 a first photosensitive element disposed to receive light directly reflected from said source, and having a first electrical output characteristic which is proportional to displacement from said first photosensitive element to said object;
 a second photosensitive element disposed to receive light diffusively reflected from said source, and having a second electrical output characteristic which is proportional to displacement between said second photosensitive element and said object and different from said first characteristic; and
 means for comparing an output from said first photosensitive element with an output from said second photosensitive element to determine the relative displacement of said object with respect to a predetermined reference point,
 said characteristics each comprising a voltage-displacement relationship in which the voltage decreases with respect to increase in displacement, said characteristics having an intersection with each other at a displacement from said object equal to the displacement of said reference point.

4. Apparatus according to claim 3 wherein said output of one of said photosensitive elements is adjustable to equalize a voltage representing said first photosensitive element and a voltage representing said second photosensitive element.

* * * * *